March 14, 1933.  R. H. KEAN  1,901,652
LIQUID PURIFICATION
Filed Aug. 25, 1928  2 Sheets-Sheet 2
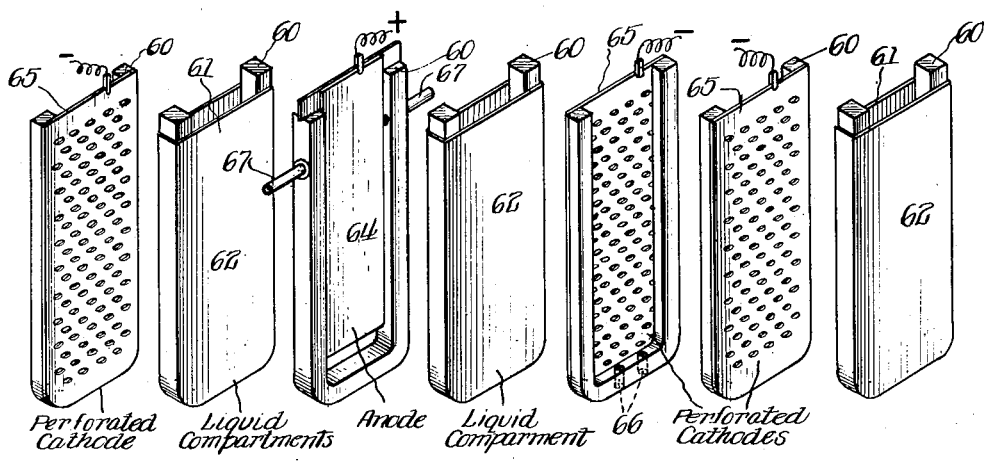
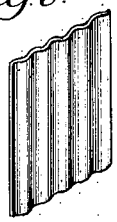
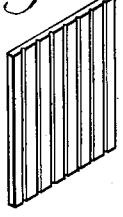
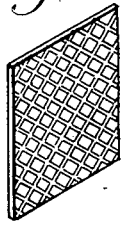
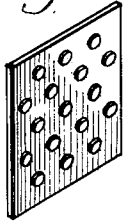
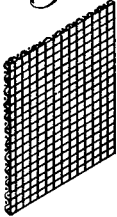
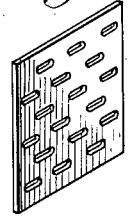
Inventor
Robert H. Kean,
By Cromwell, Greist & Warden
attys Patented Mar. 14, 1933

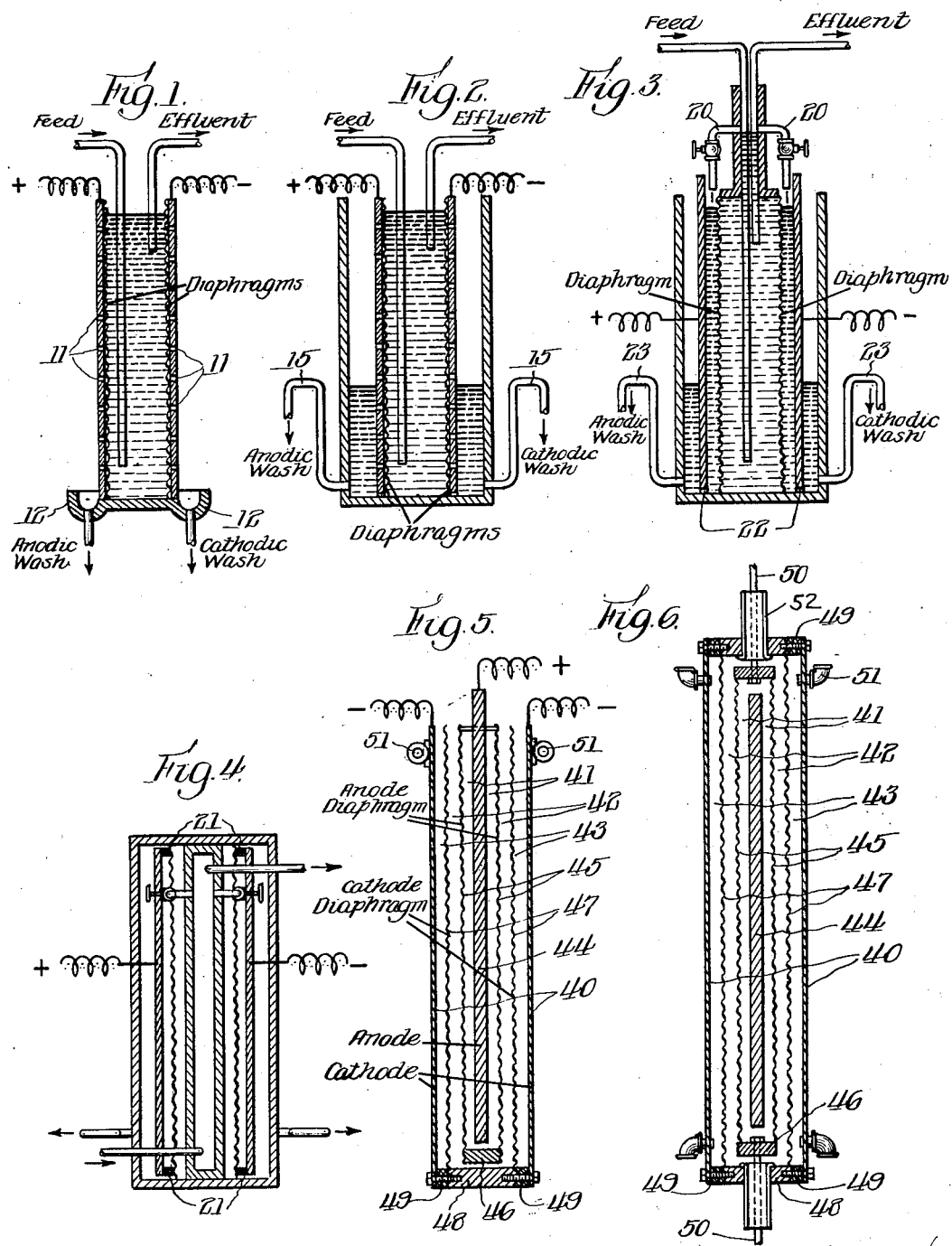

1,901,652

UNITED STATES PATENT OFFICE

ROBERT H. KEAN, OF CHICAGO, ILLINOIS, ASSIGNOR TO GENERAL ZEOLITE CO., OF CHICAGO, ILLINOIS, A CORPORATION OF ILLINOIS

LIQUID PURIFICATION

Application filed August 25, 1928. Serial No. 302,011.

The present invention relates to a process and apparatus for treating liquids and particularly relates to a process and apparatus for purifying water and aqueous liquids by electro-osmosis.

Processes for the electro-osmotic treatment of liquids are usually characterized by the separation of the liquid under treatment from immediate contact with the electrodes by means of diaphragms and other bodies of liquids. Ordinarily the space between any pair of electrodes is divided into three parts by means of two diaphragms. The central portion of this space, between the two diaphragms, contains the liquid undergoing treatment while the portions between each electrode and the adjacent diaphragm contain the electrode wash liquids. The liquids to be treated, and the electrode wash liquids are supplied to these spaces and after having undergone treatment or after having performed the desired amount of washing, they are removed. When water is being treated or purified, the raw water is not only supplied to the central space, but also utilized as wash water.

In a form of apparatus frequently employed, there are a number of cells, through which the liquid being treated flows in series while the electrode wash liquids are supplied to, and removed from, each cell separately. The bodies of wash liquid are maintained apart from bodies of liquid undergoing treatment or purification, and in them collect certain of the products of the electrochemical reactions taking place at the electrodes, which cause the anodic wash liquors to become acidic and the cathodic wash liquids to become alkaline. It is for the purpose of removing these products from the system that the wash liquors are applied and maintained separate from the liquid being treated.

An object of this invention is to improve the efficiency of electro-osmotic processes by the attainment of a greater degree of purification of the liquid being treated with a smaller consumption of electrical energy.

Another object of this invention is to effect simplification and economy in the construction of apparatus for the electro-osmotic treatment of liquids.

A further object is to provide electro-osmotic treatments with an improved system of washing the electrodes.

Other objects will appear during the course of the following description.

Several embodiments of this invention, to which it is by no means restricted, are shown on the accompanying sketches.

In the drawings:

Figures 1 to 3 represent side sectional views of single electro-osmotic cells;

Figure 4 represents a plan view of the cell shown in Figure 3;

Figures 5 and 6 represent side sectional and top views of a tank cell;

Figure 7 represents the elements of a filter press construction showing the manner in which such elements are combined; and Figures 8 to 14 represent various electrode constructions.

When electrode wash liquors are used, which themselves contain any electrolytes, the ions thus introduced in the wash liquors will migrate toward the appropriate electrodes just as do the ions of the electrolyte in the liquid undergoing purification or treatment. Not only will the anions in the anodic wash liquors migrate towards the anode, but the cations will migrate toward the cathode. This latter migration involves a passage of these cations through the anodic diaphragm into the body of liquid being treated or purified, and thence through the cathodic diaphragm into the cathodic wash liquor, and so to the cathode. The corresponding migration of anions from the cathodic wash liquor to the anode involves a similar passage of the anions through both diaphragms and the body of liquid being treated or purified.

The discharge at the electrodes of ions introduced into the system in the wash liquors does not by itself effect any desirable or useful purification of the liquid undergoing treatment in the central compartment, and from this point of view the electrical energy involved in this discharge is wasted. Furthermore, the migration through the liquid being treated of anions from the cathode wash liquors, and of cations from the anode wash liquors is also very undesirable, because in the event that the liquid being treated is removed from the system before the migration of these ions is completed, they will remain in the liquid and so contaminate it.

This migration is especially objectionable when these ions exist in the electrode wash liquors of any cell in appreciably greater concentrations than in the body of liquid being treated in that same cell. Such a condition may exist in an electro-osmotic purification of water in which water partially purified earlier in the process is fed to a cell, to which raw water is fed as wash water.

The migrations of hydrogen ions from the anodic wash liquors, and of hydroxyl ions from the cathodic wash liquors are usually less objectionable than the corresponding migrations of other cations and anions for the reason that they tend to combine to form water. It is therefore apparent that it would be very desirable to provide an electro-osmotic treatment in which the amount of electrode wash liquid was materially decreased or in which the composition of the electrode wash liquor was made substantially the same as the composition of the liquid being treated or purified or in which the tendency of ions in the electrode wash liquors to contaminate the liquid being treated or purified and to consume undesirable amounts of electric power was substantially eliminated.

When the liquid level in the central compartment of any cell is appreciably higher than the liquid levels in the electrode compartments of that cell there will be a seepage or flow of liquid from the central compartment through the diaphragms into the electrode compartments. The magnitude of the seepage will depend upon the difference in level, the permeability of the diaphragms, the temperature, and other factors. The flow into the cathodic compartments may be enhanced by the electro-endosmotic flow induced within the cell. This seepage or flow of liquid from the central compartment into the electrode compartments may be utilized to flush the electrode compartments, that is, be used as electrode wash liquid to remove from the system the undesirable products of the electrode reactions.

The reduction of the level of the liquids in the electrode compartments to obtain this difference in level between liquid in them and in the central compartment may cause an undesirable reduction in the active wetted area of the electrodes. This may be overcome by placing the electrodes sufficiently close to the diaphragms so that a film of liquid may be maintained by capillary forces, as shown upon Figures 1 and 2 between the electrodes and the diaphragms, or by providing suitable closures or retention means on the active face of the electrode so as to retain a body of liquid between the active face of the electrode and the diaphragm, as shown upon Figures 3 and 4, or by other means, in which event the wetted area of the electrode corresponds more nearly to the liquid level in the central compartment than to the liquid levels in the electrode compartments.

The close spacing of the electrodes, as shown in Figures 1 and 2, has further advantages than that of maintaining the maximum active wetted electrode area. The speed of ionic migration depends upon the voltage gradient under which the ions move, and the removal of ions from the liquid in the central compartment of the cell is the result desired. The voltage gradient in the central compartment should be as great as conditions will permit, and the voltage drop across this compartment the greatest possible fraction of the total voltage impressed upon the cell. From this point of view the voltage drops across the electrode compartments may be considered as losses of available potential. By placing the electrodes very close to the diaphragms, the path of ionic travel in the electrode compartments is shortened to a minimum and the voltage drops across these compartments are correspondingly reduced. In the preferred process, the voltage drop across the body of liquid being treated or purified should be a major part of the total voltage impressed upon the cell.

In one embodiment of this invention, diagrammatically shown on Figure 1 of the drawings, a cell, or cells, without electrode compartments are used. In these cells, the electrodes are held sufficiently close to the diaphragms that the active faces of the electrodes are wetted by films of liquid held between the electrodes and the diaphragms by capillary forces, independent of the fact that the electrodes are not actually immersed in liquid. The products of the electrochemical reactions which tend to collect around the electrodes are flushed away by the liquid seeping or flowing through the diaphragms. Small channels may be provided upon the active faces of the electrodes to facilitate the flow of liquid as necessary, or the electrodes may be pierced, or made of screen, or have other provision for the escape of liquid from their active faces. In the embodiment of the invention shown the perforations 11 are provided in the electrodes for this purpose. The electrode wash liquid flowing away from the active face of the electrode may be conducted away from the cell by the channels 12.

In another embodiment of this invention diagrammatically shown upon Figure 2 of the drawings, a cell, or cells, divided into three compartments may be utilized. The wash and liquid being treated are caused to flow through said compartments. The electrodes may be immersed in the electrode wash liquid. A control of the difference in levels from one side of each diaphragm to the other side may be used to influence the amount of seepage or flow through the diaphragm into the electrode compartments. Although this seepage may constitute a minor portion of the total electrode wash liquid, it should preferably constitute a major portion. The seepage may be supplemented by otherwise introducing treated water from the central compartment into the electrode compartments, and/or by similarly introducing into the electrode compartments raw or treated water from some other source. In the embodiment of the invention shown in Figure 1, each electrode is placed so close to the diaphragm that a film of liquid is maintained between the electrode and the diaphragms by capillary forces. This placing of the electrode makes necessary some provision for facilitating the flow of wash liquid away from the active face of the electrode; which is obtained by corrugating the electrode, by channelling or grooving the face of the electrode, or by piercing the electrode. This last-mentioned expedient is utilized in the embodiment of the invention shown in Figure 2. In this latter embodiment, the levels of liquid in the electrode compartments are controlled by the overflows 15.

In still another embodiment of this invention, diagrammatically shown upon Figures 3 and 4 of the drawings, the electrode wash liquor is made up in whole or part of liquid being treated or purified which is conducted into the electrode compartments by gravity flow due to maintenance of a greater head in the purified water compartment than in the electrode compartments or by other means, as for example by pumping the liquid being treated or purified in each cell into its electrode compartments. In this embodiment the liquid level in the central compartment of any cell may be caused to stand higher than top of the active surface of the electrodes, or even higher than the top of the diaphragm. The liquid being treated may be caused to overflow the top of diaphragm into the electrode compartments when the liquid level in the central compartment is higher than the diaphragm or if the liquid level is not higher than the diaphragm, openings may be made in the diaphragms adjacent to the liquid level in the central compartments so as to permit a flow of electrode wash liquid from the central compartment across the active face of the electrode.

In the particular embodiment of the invention shown in Figures 3 and 4 of the drawings, Figure 3 being a side sectional view and Figure 4 being a top plan view, the level of the liquid being treated or purified is maintained at a higher level than the top of the electrodes and the diaphragms. The liquid from the central compartment is caused to overflow through the conduits 20 from the central compartment to the electrode compartment. A layer of overflowing liquid is maintained on the face of the electrode by means of the side closures 21 (see Figure 4). This layer of liquid flows downward across the active face of the electrode and finally flows away from such face of the electrode by restricted liquid passages 22 at the bottom of the electrode. These liquid passages are made of such a size that the overflowing wash liquid will be maintained upon the electrode face a suitable length of time. The level of the liquid in the electrode compartments is controlled and the rate of flow of liquid downward over the active face of the electrode is influenced by the position of the overflow pipe 23. While in the drawings illustrative of one embodiment of the invention, the overflow pipes 23 are shown approximately at the same level, such pipes may however be at different levels to provide different levels of liquid adjacent the negative and positive electrodes respectively.

In these embodiments of the invention, the electrodes, in addition to their function as conductors of electricity, may also be caused to serve as structural elements of the apparatus, contributing to its strength and rigidity, and helping to support the hydrostatic pressure of the liquid contained in the different compartments therein. For example, in apparatus of the "tank cell" type where each cell is constructed in the form of a tank and placed apart from other cells, the electrodes may be caused to serve as portions of the walls of the tank as shown in Figures 5 and 6. In apparatus of the "filter press" type, the necessity for water-tight electrode compartments may be eliminated as shown in Figure 7.

In the tank cell construction shown upon Figures 5 and 6, the side walls of the cell are formed by the cathodes 40. The cell shown upon these figures is provided with five compartments, a central anode compartment 41, two intermediate 42 compartments for the water being purified, and two outside cathode compartments 43. The anode 44 is contained in the central anode compartment 41. The walls of the anode compartment are formed by the diaphragms 45, which diaphragms are attached to the frame 46 of the compartment. The outside walls of the water compartments are formed by the diaphragms 47 which are attached to the frame 48 of the cell. The cathodes 40 are attached to the cell frame. The spacers 49 regulate the width of the cathode compartments. Wash liquid may be removed from, and if desirable fed in to the anode compartment by the connections 50 and the cathode compartments by the connections 51. The liquid being purified is fed into and removed from the intermediate compartments 42 by the connections 52.

In the filter press construction shown in Figure 7 the U-frames 60 are all clamped together as in a filter press. The compartments 61 for the liquid to be treated is formed by stretching a diaphragm 62 around every second and third U-frame 60 alternatively, forming a series of five compartment cells. These cells consist of a central anode compartment, two intermediate compartments for the liquid being treated, and two outside cathode compartments. In the compartments 63 formed by every sixth U-frame 60, is suspended an anode 64. Every fourth and fifth U-frame 60 forms cathode compartments 65. Attached to the side of the U-frame 60 of the cathode compartments 65, which is closest to the diaphragm 62 of the liquid compartment 61, is a perforated or other suitably channelled (as shown upon Figures 8 to 14) cathode. The cathode compartments 65 are provided with the channels 66 for the escape of cathode wash liquids. The anode wash liquid may be removed from, and in certain cases also fed into, the anode compartment 64 by the liquid connections 67. Suitable liquid connections (not shown) are also provided for the compartments 62. The same construction may also be applied to a filter press construction composed of three compartment cells, in which the anode will be suitably channelled or otherwise drained and positioned closely adjacent to the diaphragm 62.

Figures 8 to 14 show a number of various constructions of electrodes to insure proper flow of wash liquid when the electrode is placed in close proximity to the diaphragm. In Figure 8 there is shown an electrode corrugated on both faces, in Figure 9 an electrode corrugated on its active face only, in Figure 10 an electrode grooved vertically on its active face, in Figure 11 an electrode grooved in two diagrammatical directions on its active face, in Figure 12 an electrode provided with studs or small projections on its active face, in Figure 13 a screen electrode and in Figure 14 a pierced or perforated electrode similar to those shown in Figures 1 and 2. By utilization of electrodes of this character, not only is there a satisfactory flow of electrode wash liquid across the active face of the electrode, but the direction of such flow may also be controlled. For example, in Figures 8, 9 and 10, the flow is vertically across the active face of the electrode, in Figure 11 it is diagonally across the active face of the electrode, and in Figures 13 and 14 it is perpendicularly away from the active face of the electrode.

Comparisons of results which may be obtained in the treatment of water by the present process and by other processes are given in the following tables:

Table I

| Apparatus | Flow liters per hour per 1.74 sq. ft. of anode area | Electrical power watts | Total dissolved solids—parts per million | | Efficiency factor. Watt hrs. per liter per 100 ppm. removed from water |
|---|---|---|---|---|---|
| | | | Influent water | Effluent water | |
| Type IV | 9.5 | 14.9 | 143 | 114 | 5.4 |
| Type IV | 9.2 | 20.9 | 143 | 105 | 6.0 |
| Unsubmerged electrode | 9.5 | 18.7 | 150 | 45 | 1.8 |

Table II

| Type IV | 9.5 | 14.9 | 143 | 114 | 5.4 |
|---|---|---|---|---|---|
| Type IV | 9.2 | 20.9 | 143 | 105 | 6.0 |
| Unsubmerged electrode | 23.2 | 6.0 | 152 | 113 | 0.66 |

"Type IV" apparatus is an apparatus of the filter press type in which the wash liquid is supplied separately to each electrode compartment from an outside source. "Unsubmerged electrode" apparatus is an embodiment of this invention similar to that shown in Figure 1, in which a magnetite anode and a bronze cathode are held in close proximity to sail cloth diaphragms. The face of the anode is provided with small channels for the flow of wash liquid, and the cathode consists of a woven bronze wire screen, through the meshes of which the washing liquor can escape. The electrodes are unsubmerged, the supply of washing liquid being furnished entirely by seepage or flow through the sail cloth diaphragms. The liquid under treatment is Chicago city water with a solid content of 140 to 150 parts per million calculated as calcium carbonate. In the "Type IV" apparatus, the water being treated was passed through six five compartment cells connected in series across 110 volts, while in the unsubmerged electrode apparatus, the water was passed through only one cell.

Table I shows that with equal power consumptions and rates of production of purified liquid, a high degree of purification may be effected by this invention. Thus the dissolved solids of Chicago water are reduced from 150 ppm. to 45 ppm. by the use of this invention in comparison to a reduction of from 143 to 110 (average) obtained by other methods.

Table II shows a comparison of results obtained when Chicago water is purified to the same degree by the two methods. This invention permits the production of 23.2 liters per hour with a power consumption of 6.0 watts as compared with a production of approximately 9.5 liters per hour with a power of consumption of 15 to 20 watts by other method.

The maintenance of a higher level in the compartment containing the liquid being treated or purified than in the compartments containing the electrodes, not only tends to cause a seepage of the liquid being treated or purified through the diaphragms into the electrode compartments, but it also tends to prevent or to insure against a possible seepage of the electrode wash liquid into the body of liquid being treated or purified. In the preferred embodiment of this invention, the level of the liquid being treated should be at least ¼ to ½ inch higher than the level of the electrode wash liquor. For example, in a laboratory apparatus of 8" depth, the highest liquid level may be an inch or more higher than the lowest liquid level while in a commercial apparatus with a depth of 40", the level of the liquid being treated or purified may be 38" in height, while the level of the electrode wash liquor may be 26" to 31" in height.

It will be noted in the preferred embodiment of the invention, when the electrode wash liquid will be composed for the major part of seepage or overflow of the liquid being treated, or purified, that the composition of the electrode wash liquid as applied to the electrode, will substantially be the same as, or will approximate, the composition of the liquid being purified or treated. This will greatly reduce the tendency of the electrode wash liquid to cause contamination of the liquid being purified or treated.

It will also be noted that the flow of electrode wash liquid from the compartment containing the liquid being treated or purified may be readily controlled by controlling the difference in level between the liquid being treated and the electrode wash liquid. It is frequently desirable to have a greater volume of liquid flowing through the anode compartment than through the cathode compartment and in such a case the difference between the level of the liquid being treated and the level in the anode compartment should be greater than the corresponding difference between the level of the liquid being treated and the level in the cathode compartment.

A similar result might also be obtained by providing an overflow into the anode compartment and not into the cathode compartment or by utilizing a more permeable diaphragm between the liquid being treated and the anode than between the liquid being treated and the cathode, or by causing additional liquid from an outside source to flow through the anode compartment and not through the cathode compartment.

What is claimed is:

1. A process of electro-osmotically treating a liquid by causing a body of said liquid to flow between positive and negative electrodes, impressing upon said liquid an electro-motive force by means of said electrodes, separating said body of liquid being treated from said electrodes by means of diaphragms and other bodies of liquid, flowing said last mentioned bodies of liquid between and in contact with said diaphragms and said electrodes, and maintaining the surfaces of said body of liquid being treated at a substantially higher level than the surfaces of said bodies of liquid flowing between and in contact with said diaphragms and said electrodes.

2. A process of electro-osmotically treating a liquid which comprises causing a body of the liquid being treated to flow between diaphragms, impressing upon said liquid an electromotive force by means of electrodes placed close to and on the opposite sides of said diaphragms from said body of liquid under treatment, causing other bodies of liquid to flow between and in contact with said diaphragms and said electrodes, maintaining the surface of said body of liquid between diaphragms at a higher level than the surfaces of said bodies of liquid between said diaphragms and said electrodes so that a portion of said liquid being treated will flow through and into and constitute a major portion of said bodies of liquid flowing between and in contact with said diaphragms and said electrodes.

3. A process of electro-osmotically treating liquids which comprises maintaining an electric potential gradient within a series of liquid bodies being treated by means of a series of positive and negative electrodes, flowing said liquid between said electrodes, separating said liquid from said electrodes by diaphragms closely adjacent thereto, maintaining other bodies of liquid between and in contact with said diaphragms and said electrodes and causing substantial portions of the bodies of liquid being treated to supply through gravity flow the bodies of liquid between and in contact with the diaphragms and electrodes.

4. A process of electro-osmotically treating a liquid by causing a body of said liquid to flow between positive and negative electrodes, impressing upon said liquid an electro-motive force by means of said electrodes, separating said body of liquid being treated from said electrodes by means of diaphragms and other bodies of liquid, flowing said last mentioned bodies of liquid between and in contact with said diaphragms and said electrodes, maintaining the surfaces of said body of liquid being treated at a higher level than the surfaces of said bodies of liquid flowing between and in contact with said diaphragms and said electrodes, causing portions of said liquid separated from said electrodes to flow by gravity into said bodies of liquid flowing between and in contact with said diaphragms and said electrodes and utilizing such flow as the major portion of said bodies of liquid flowing between and in contact with said diaphragms and said electrodes.

5. A process of electro-osmotically treating liquids which comprises maintaining an electric potential gradient within a body of liquid being treated by means of positive and negative electrodes, flowing said liquid between said electrodes, separating said liquid from said electrodes by diaphragms, placing other bodies of liquid between and in contact with said diaphragms and said electrodes, causing portions of said body of liquid separated from said electrodes to flow by gravity into the body of liquid flowing between and in contact with a positive electrode and the adjacent diaphragm and utilizing such flow as washing fluid to make up another body of liquid maintained at a predetermined level below the level of the liquid being treated.

6. A process of electro-osmotic treatment of liquids in which an electric potential gradient is maintained within a body of the liquid being treated by means of positive and negative electrodes, which comprises separating the liquid under treatment from the electrodes by means of diaphragms, causing part of the liquid being treated to flow through said diaphragms by gravity and between and in contact with said diaphragms and electrodes, and utilizing as washing liquid for the electrodes the liquid flow between and in contact with the electrodes and diaphragms.

7. A process of electro-osmotically treating a liquid separated from positive and negative electrodes by diaphragms, which comprises maintaining the surface of the body of liquid being treated between diaphragms at a higher level than the surface of bodies of liquid between the diaphragms and the electrodes so that a portion of said liquid being treated will flow through the diaphragms toward the electrodes and utilizing such flow as the major portion of washing liquid flowing between and in contact with the diaphragms and the electrodes.

8. An electro-osmotic treatment of liquids separated from positive and negative electrodes by diaphragms, which comprises causing part of the liquid being treated to overflow the diaphragms and utilizing such overflow as washing liquid flowing by gravity between and in contact with the electrodes and diaphragms.

9. A process of electro-osmotically treating a liquid separated from positive and negative electrodes by diaphragms, which comprises maintaining the surface of the body of liquid between diaphragms being treated at a higher level than the surfaces of bodies of liquid between the diaphragms and the electrodes so that a portion of said liquid being treated will overflow the diaphragms, and utilizing such overflow as the major portion of bodies of washing liquid flowing by gravity between and in contact with the diaphragms and the electrodes.

10. A process of electro-osmotically treating a liquid separated from positive and negative electrodes by diaphragms, which comprises maintaining the surfaces of the body of liquid between the diaphragms being treated at a higher level than the surfaces of bodies of liquid flowing by gravity between and in contact with the diaphragms and the electrodes, and maintaining the surface of bodies of the liquid in contact with the electrodes at predetermined levels lower than the level of liquid between the diaphragms.

11. The process of purifying liquids which comprises passing a body of the liquid to be purified through an electro-osmotic cell and out of contact with the electrodes of said cell, withdrawing portions from said body of liquid, and passing said withdrawn portions of liquid in contact with the electrodes of said cell, whereby said withdrawn portions act as wash liquid for said electrodes.

In testimony whereof I have hereunto subscribed my name.

ROBERT H. KEAN.